United States Patent [19]
Doi et al.

[11] Patent Number: 4,579,366
[45] Date of Patent: Apr. 1, 1986

[54] ACTIVE SUSPENSION APPARATUS

[75] Inventors: Shunichi Doi; Junzo Hasegawa; Yasutaka Hayashi; Hideo Arakawa; Yuzo Yamamoto; Noboru Sugiura, all of Aichi, Japan

[73] Assignee: Kabushiki Kaisha Toyota Chuo Kenkyusho, Aichi, Japan

[21] Appl. No.: 612,558

[22] Filed: May 21, 1984

[30] Foreign Application Priority Data

May 20, 1983 [JP] Japan ............................... 58-87672

[51] Int. Cl.$^4$ ........................................... B60G 11/26
[52] U.S. Cl. .................................. 280/707; 280/611; 280/DIG. 1
[58] Field of Search ................ 280/64, 702, 707, 709, 280/DIG. 1; 267/64.22; 307/10 R

[56] References Cited

U.S. PATENT DOCUMENTS

| | | | |
|---|---|---|---|
| 3,830,138 | 8/1974 | Joweleit | 280/707 |
| 3,995,883 | 12/1976 | Glaze | 280/707 |
| 4,164,664 | 8/1979 | Kasiewicz | 280/707 |
| 4,391,452 | 7/1983 | Ohmori | 280/707 |
| 4,468,050 | 8/1984 | Woods et al. | 280/DIG. 1 |

FOREIGN PATENT DOCUMENTS 793823 1/1981 U.S.S.R. .............................. 280/707

Primary Examiner—Joseph F. Peters, Jr.
Assistant Examiner—Kenneth R. Rice

[57] ABSTRACT

An active suspension apparatus detects a relative displacement (x) between an axle and a vehicle body, discriminates a road surface state in accordance with the relative displacement and a change rate ($\dot{x}$) in unit time which is derived from the relative displacement (x), and optimally controls characteristics of damping forces of hydropneumatic suspensions in accordance with a discrimination result (i.e., a road surface state). This discrimination is performed in accordance with a sum (Ax+Bx) of a signal obtained by multiplying the relative displacement (x) with a predetermined coefficient and a signal obtained by multiplying the change rate ($\dot{x}$) with another predetermined coefficient. These coefficients are obtained in accordance with riding comfort against vibrations. The characteristics of the damping force of the hydropneumatic suspension are controlled by controlling the opening of throttle valves disposed between hydropneumatic chambers and actuators.

10 Claims, 14 Drawing Figures

ACTIVE SUSPENSION APPARATUS

BACKGROUND OF THE INVENTION

The present invention relates to an active suspension apparatus using hydropneumatic devices for suspending a vehicle body on wheels by utilizing fluid or gas pressure.

There is a conventional damping apparatus for vehicle suspension wherein a vehicle travel speed, a relative displacement between wheels and corresponding axles, its relative velocity, and a vehicle acceleration are given as state variables so as to change damping characteristics of shock absorbers. Control conditions are limited on the basis of evaluation standards of individual state variables although travel conditions of a vehicle vary greatly, thus disabling proper control of the characteristics of damping force in accordance with states of a road surface. In particular, flexibility in control conditions is so limited as to decrease transient vibrations due to unevenness of a road surface and at the time when a vehicle rides over a bump and to improve stability and controllability of a vehicle when the vehicle detours an obstacle. As a result, satisfactory vibration and stability control of the vehicle cannot be performed, resulting in inconvenience.

In general, vehicles ride on various roads with surfaces varying from a smooth road surface to a rough road surface at a wide speed range from a high speed to a low speed. Therefore, the characteristics of damping forces in the suspension apparatus must be adjusted to satisfy possible road conditions. According to the conventional techniques, the damping forces are switched to reduce pitch/bounce motion at the time of starting and braking of the vehicle and rolling motion at the time of lane changing. In this case, optimal control is not based on the actual road state but on the level control or control for a predetermined period of time. Thus, the conventional control cannot cover all travel conditions.

SUMMARY OF THE INVENTION

The present invention has been made to overcome the conventional drawbacks, and has as its object to provide an active suspension apparatus capable of optimally controlling the characteristics of damping force of a hydropneumatic suspension in accordance with an actual condition of a road on which a vehicle is riding, improving greatly riding comfort on both smooth and rough roads, and contributing to high stability and controllability.

In order to achieve the above object of the present invention, the present inventors have repeated experiments and subsequent analyses on riding comfort control of a vehicle and have found that a relative displacement between axles and the vehicle body and a change rate of this relative displacement as a function of time are important factors. These factors have led the present inventors to attain the present invention.

An active suspension apparatus according to an aspect of the present invention is characterized by comprising: displacement detecting means for detecting a relative displacement (x) between an axle and a vehicle body; discriminating means for discriminating an actual state of a road surface in accordance with a value $(Ax + B\dot{x})$, a sum obtained such that the relative displacement (x) and the change rate ($\dot{x}$) in unit time are respectively multiplied with predetermined coefficients A and B and that the resultant product Ax is added to the product $B\dot{x}$; hydropneumatic suspension means having actuators, hydropneumatic springs with hydropneumatic chambers, and throttle valves respectively disposed between the actuators and the hydropneumatic chambers; and driving means for controlling the openings of the throttle valves in accordance with a road surface state signal supplied from the discriminating means, whereby the characteristics of a damping force are controlled in accordance with the actual state of the road surface on which the vehicle is riding.

More specifically, the discriminating means comprises: a differentiator for differentiating the relative displacement x detected by the displacement detecting means and for producing a change rate ($\dot{x}$) of the relative displacement; a selecting circuit for extracting a component ($\dot{x}+$) corresponding to an expanded side of said hydropneumatic springs and a component ($\dot{x}-$) corresponding to a compressed side of said hydropneumatic spring in accordance with the change rate ($\dot{x}$) of the relative displacement which is generated from the differentiator; an operation circuit for multiplying with different coefficients the relative displacement (x) and the components ($\dot{x}+$ and $\dot{x}-$) extracted from the selecting circuit and for adding resultant products; and a comparator for comparing an output generated from the operation circuit with a reference value and for generating the road surface state signal.

The selecting circuit in the discriminating means comprises: a first half wave detecting circuit for extracting the component ($\dot{x}+$) of one polarity corresponding to the expanded side of said hydropneumatic spring from a signal which represents the change rate ($\dot{x}$) in unit time and which is generated from the differentiator, and for producing an absolute value of the extracted component; and a second half wave detecting circuit for extracting the component ($\dot{x}-$) of the other polarity corresponding to the compressed side of said hydropneumatic spring from the signal which represents the change rate ($\dot{x}$) in unit time and which is generated from the differentiator, and for producing an absolute value of the extracted component. The discriminating means further has a full wave linear detecting circuit for generating a signal corresponding to an absolute value of the relative displacement (x) detected by the displacement detecting means. The operation circuit multiplies with the respective coefficients the outputs which are generated from the full wave linear detecting circuit and the first and second half wave detecting circuits, and adds the resultant products. In order to further improve riding comfort, the operation circuit multiplies the signal component corresponding to the expanded hydropneumatic spring with a larger coefficient than that of the signal component corresponding to the compressed side of said hydropneumatic spring.

The comparator compares the signal generated from the operation circuit with a predetermined reference signal. When the signal is smaller than the reference signal, the comparator generates a first signal representing that the vehicle is riding on a smooth road surface. However, when the signal is larger than the reference signal, the comparator generates a second signal representing that the vehicle is riding on a rough road surface.

The throttle valve of the hydropneumatic suspension means comprises first and second orifices, and is controlled by the driving means such that both first and second orifices having respective predetermined opening areas are opened when a discrimination result from the discriminating means Indicates a smooth road surface, and that the either first or the second orifice is opened when the discrimination result from the discriminating means indicates a rough road surface.

The other objects, features and advantages of the present invention will be apparent from the following description taken in conjunction with the accompanying drawings.

BRIEF DESCRIPTION OF THE DRAWINGS

FIGS. 9A and 9B are respectively a plan view and a side view of an irregular pyramid-shaped rubber bushing of nonlinear spring characteristics which is suitably used in the apparatus shown in FIG. 3, and FIGS. 9C and 9D are respectively a plan view and a side view of a semi-ellipsoidal conical rubber bushing of nonlinear spring characteristics which is suitably used in the apparatus shown in FIG. 3;

DETAILED DESCRIPTION OF THE INVENTION

The principle of control according to the present invention will be described with reference to FIGS. 1 and 2.

The travel state of a vehicle can be represented by a relative displacement x between each axle and a vehicle body and by its change rate in unit time (i.e., relative velocity $\dot{x}$). In FIG. 1, the relative displacement x is plotted along the abscissa, and the relative velocity $\dot{x}$ is plotted along the ordinate. The travel state given by a road surface state, a vehicle speed and so on is given by a point in the x—$\dot{x}$ coordinate system.

The present inventors have performed test drives at different operating conditions on roads having different surface states so as to determine the relationship between the relative displacement between the axle and the vehicle body and the change rate $\dot{x}$ in unit time. On a rough road, both the values of the displacement x and the change rate $\dot{x}$ became large, resulting in poor riding comfort and often unstable operation (i.e., degradation of stability and controllability). In addition, if a sum $(x+\dot{x})$ of the displacement x and the change rate $\dot{x}$ exceeded a predetermined value although neither the displacement x and the change rate $\dot{x}$, and variously vibrations occurred to degrade riding comfort and other factors.

The present inventors, therefore, identified the relationship between a road surface state and the sum of the displacement $\dot{x}$ and the change rate x, and variously controlled the characteristics of damping forces of the hydropneumatic suspension in accordance with this relationship. The present inventors found that the contributions of the displacement x and the change rate $\dot{x}$ to the riding comfort and other factors were different from each other, and that multiplication of specific coefficients with the displacement x and the change rate $\dot{x}$ improved the riding comfort. In other words, it was found out that the coefficients A and B for obtaining the sum $(Ax+B\dot{x})$ must have a predetermined ratio.

In addition, in the vehicle suspension system, the displacements x and the corresponding change rates $\dot{x}$ must change to have a predetermined ratio at the expanded and compressed hydropneumatic springs. In other words, $Ax+BCs\dot{x}$ and $Ax+BCc\dot{x}$ must be taken account where Cs is the velocity coefficient at the expanded hydropneumatic spring and Cc is the velocity coefficient at the compressed one.

According to the present invention, therefore, as indicated by lines P and Q, the characteristics of damping force of the hydropneumatic suspension in the triangular areas surrounded by the x-axis, the $\dot{x}$-axis and the lines P and Q must differ from that in any other area so as to improve riding comfort against vibrations. These triangular areas must be given within an appropriate range. The present inventors found the appropriate triangular areas in accordance with experiments. The present inventors determined that the triangular areas corresponded to the range within which the both values of displacements x and the corresponding change rates $\dot{x}$ fell when the vehicle travelled on smooth and normal roads, and that the area excluding the triangular areas corresponded to the range when the vehicle travelled on a rough road.

The above relationship is given by mathematical expressions representing evaluation values of relative motion at a given time in accordance with the relative displacement x and its relative velocity $\dot{x}$ when the operating conditions of the vehicle spontaneously change. More particularly, the evaluation values Ys and —Yc at the expanded and compressed hydropneumatic springs are:

$$Ys = Ax + BCs\dot{x} \quad \ldots (1)$$

$$-Yc = Ax + BCc\dot{x} \quad \ldots (2)$$

where A and B are the coefficients representing the contribution factors of the relative displacement and the relative velocity, respectively, and Cs and Cc are the velocity coefficients at the expanded and compressed springs.

Figure 1:
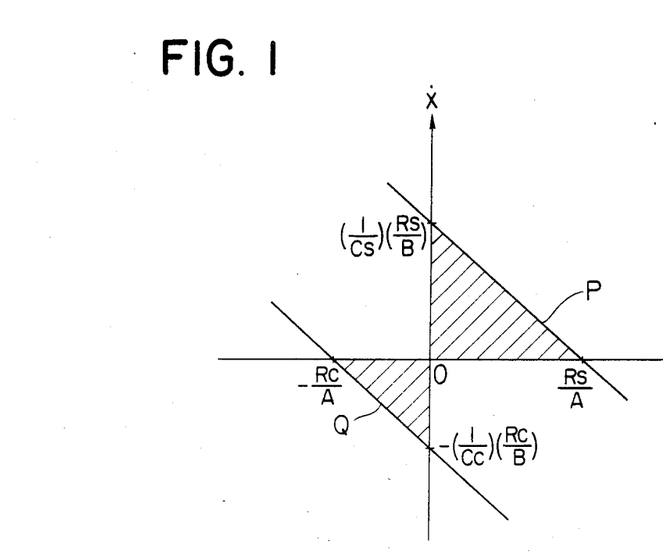
FIG. 1 is a graph showing a road surface state by coordinates of a relative displacement x and its change rate $\dot{x}$ in unit time so as to explain the principle of the present invention.
Figure 2:
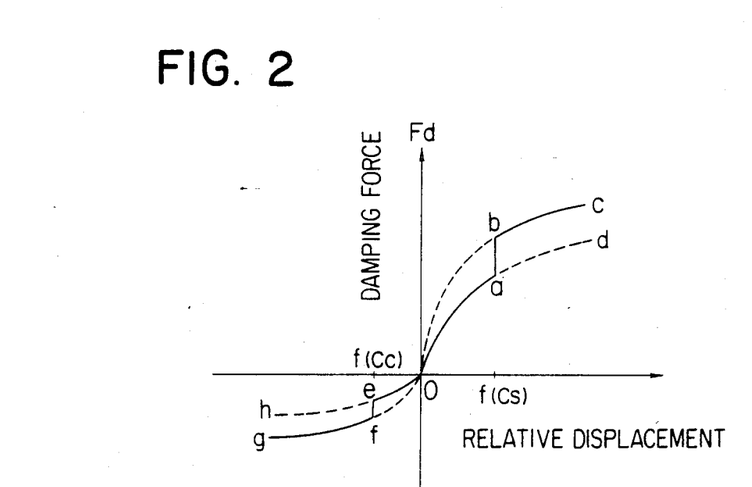
FIG. 2 is a graph showing changes in damping force of a hydropneumatic suspension as a function of the relative velocity.

Equations (1) and (2) above are plotted as the lines P and Q in FIG. 1. When reference values for evaluating motion are given as Rs and —Rc, comparison among Ys, Rs, —Yc and —Rc discriminates whether a given road state corresponds to a rough road state or a smooth or normal road state. The characteristics of the damping forces of the hydropneumatic suspension can be controlled in accordance with the discrimination result, thereby obtaining an optimal travel state. FIG. 2 is a graph showing a two-step control operation wherein higher and lower damping forces are switched in accordance with the discrimination result. The relative velocity $\dot{x}$ is plotted along the abscissa and damping force Fd is plotted along the ordinate. The switching points of the two-step damping forces Fd are determined in accordance with the values Cs and Cc of equations (1) and (2) above for determining the triangular areas in FIG. 1 and the reference values Rs and −Rc, and are given to be f(Cs) and f(Cc) in FIG. 2.

When the vehicle travels on a rough road surface which corresponds to the area excluding the triangular areas, a strong damping force is given as indicated by a curve bc or fg, thereby effectively absorbing vibrations. However, when the vehicle travels on smooth or normal road surfaces which correspond to the triangular areas, a weak damping force is given as indicated by a curve Oa or Oe, thereby preventing the degradation of riding comfort.

Figure 3:
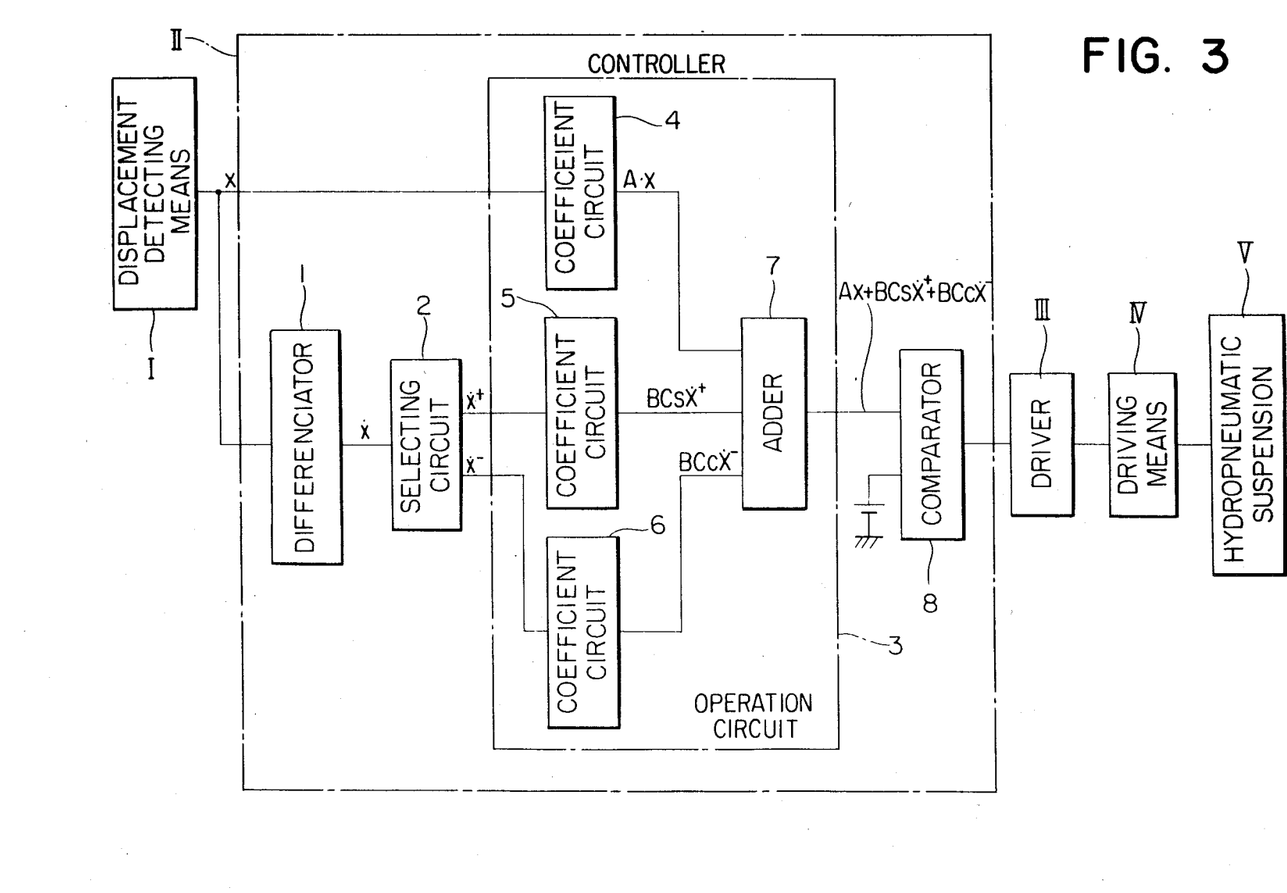
FIG. 3 is a block diagram showing the basic arrangement of an active suspension apparatus according to the present invention.

FIG. 3 is a block diagram showing the basic arrangement of the active suspension apparatus according to the present invention.

A controller II of the active suspension apparatus comprises: a differentiator 1 for differentiating the relative displacement x detected by a displacement detecting means I and for generating the corresponding change rate $\dot{x}$ in unit time; a selecting circuit 2 for extracting a component $\dot{x}+$ corresponding to the expanded hydropneumatic spring and a component $\dot{x}-$ corresponding to the compressed hydropneumatic spring from the change rate $\dot{x}$ generated from the differentiator 1; an operation circuit 3 for multiplying the respective coefficients with the relative displacement x and the components $\dot{x}+$ and $\dot{x}-$ extracted from the selecting circuit 2 and for adding the resultant products; and a comparator 8 for comparing the signal (Ax+BCs$\dot{x}$ or Ax+BCc$\dot{x}$) with the reference value which determines the corresponding triangular area, and for generating a road surface state signal. The operation circuit 3 comprises coefficient circuits 4 to 6 and an adder 7.

The comparator 8 in the controller II supplies a signal to a driver III when a combination of the relative displacement x and its change rate x is plotted outside the triangular areas. The driver III amplifies the signal supplied from the comparator 8, and an amplified signal is supplied to a driving means IV. The driving means IV controls the opening of a throttle valve disposed between each actuator and the hydropneumatic chamber of the corresponding hydropneumatic spring in a hydropneumatic suspension V.

In the active suspension apparatus as is apparent from the above description, it is determined by the controller whether or not the value Ys =Ax +BCs$\dot{x}$ or Yc =Ax+BCc$\dot{x}$ obtained such that the relative displacement x between the axle and the vehicle body is multiplied with the coefficient A, the change rate $\dot{x}$ is multiplied with the coefficients B and Cs or Cc, and the resultant products Ax and BCs or BCc are added together exceed the reference value Rs or Rc which determines the triangular area corresponding to the road surface state. When Ys or Yc exceeds Rs or Rc (i.e., when the vehicle is detected to be riding on a rough road surface), the driving means is controlled to obtain a high damping force. However, when Ys or Yc is smaller than Rs or Rc (i.e., when the vehicle is detected to ride on smooth and normal road surfaces), a low damping force is obtained.

According to the present invention, therefore, the characteristics of damping force of the hydropneumatic suspension are controlled in accordance with the road surface states, so that the vibrations can be effectively absorbed by a strong damping force when the vehicle rides on a rough road surface, and that a weak damping force acts to prevent degradation of riding comfort when the vehicle rides on smooth and normal road surfaces.

Furthermore, when a road has a bump with a predetermined level, vibrations can be effectively absorbed by the high characteristic of the damping force. In other case, it is also possible to control vibrations such that a weak damping force is applied to prevent the vibrations under the spring around the axle from being transmitted to the vehicle body.

In fine, according to the present invention, the appropriate damping force acts on the hydropneumatic suspension in accordance with the given road surface state, so that riding comfort, and stability and controllability can be greatly improved.

The active suspension apparatus of this embodiment of the present invention will be described in detail with reference to FIGS. 4 to 9.

The active suspension apparatus basically comprises the displacement detecting means I, the controller II, the driver III, the driving means IV and the hydropneumatic suspension V, as shown in FIG. 3.

Figure 4:
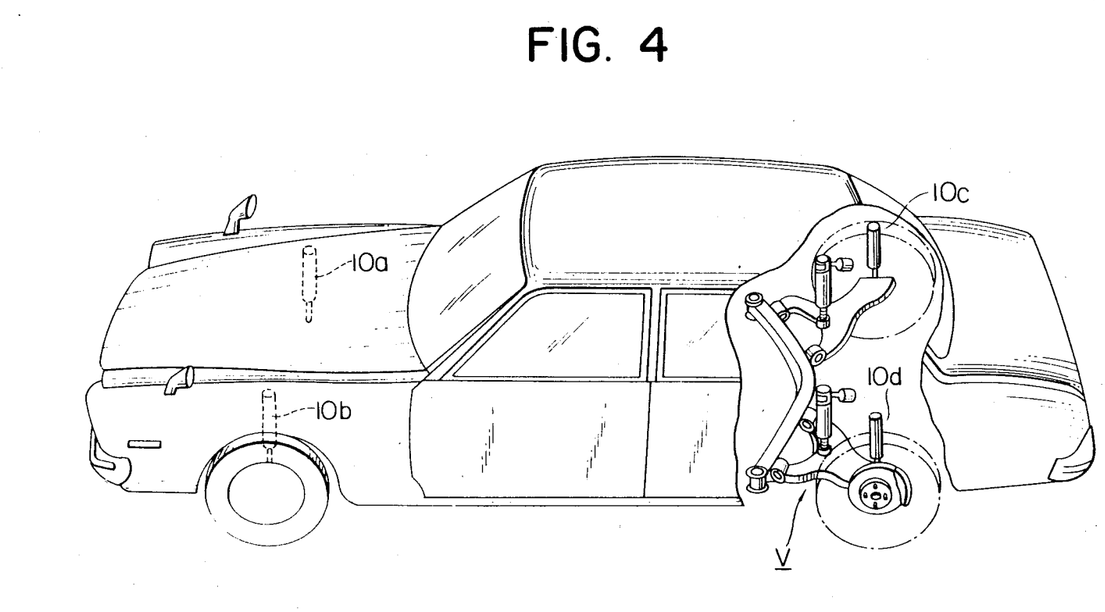
FIG. 4 is partially cutaway perspective view showing a displacement detecting means shown in FIG. 3.

As shown in FIG. 4, the displacement detecting means I comprises four bar type potentiometers 10a, 10b, 10c and 10d between the vehicle body, trailing arms and lower arms for rotatably supporting the front and rear axles of the front and rear wheels. The displacement detecting means I detects the relative displacements between the axles and the vehicle body while the vehicle is travelling.

Figure 5:
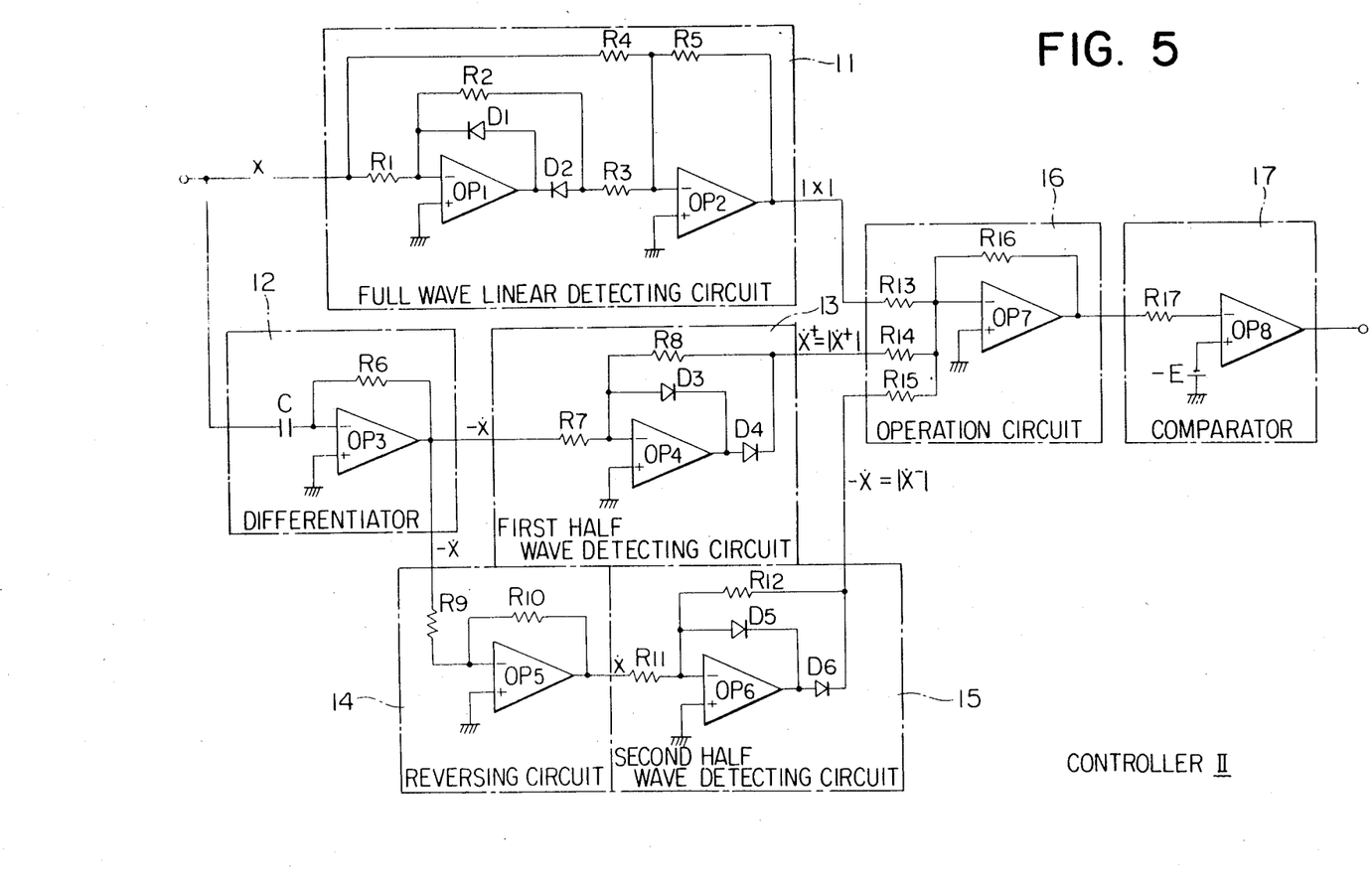
FIG. 5 is a circuit diagram showing a controller shown in FIG. 3.

As shown in FIG. 5, the controller II comprises a full wave linear detecting circuit 11 connected to the potentiometer 10c as the output stage of the displacement detecting means I, a differentiator 12 connected to the displacement detecting means I, a first half wave linear detecting circuit 13 connected to the differentiator 12, a reversing circuit 14, a second half wave linear detecting circuit 15 connected to the reversing circuit 14, an operation circuit 16 connected to outputs of the respective detecting circuits 11, 13 and 15, and a comparator 17 for comparing an output generated from the operation circuit 16 with a reference value.

The full wave linear detecting circuit 11 comprises a half wave rectifier constituted by an operational amplifier OP1, resistors R1 and R2 and diodes D1 and D2 so as to invert and amplify a positive half cycle, and an inverting adder constituted by an operational amplifier OP2 and resistors R3 to R5. The full wave linear detecting circuit 11 generates a signal (i.e., signal |x| corresponding to the absolute value of the relative displacement x) obtained by full-wave rectifying the relative displacement x. In this manner, the full wave linear detecting circuit 11 always generates an absolute value signal irrespective of expanding and compressing of the hydropneumatic spring.

The differentiator 12 comprises a conventional differentiator constituted by an operational amplifier OP3, a capacitor C and a resistor R6. The differentiator 12 generates a signal $-\dot{x}$ obtained by differentiating the relative displacement x and inverting the differentiated signal.

A circuit constituted by the reversing circuit 14 and the first and second half wave linear detecting circuits 13 and 15 extracts components (to be referred to as $\dot{x}^+$ and $\dot{x}^-$) of the change rate $\dot{x}$ which correspond to the expanded and compressed hydropneumatic springs. The above circuit then generates absolute values $|\dot{x}^+|$ and $|\dot{x}^-|$. The first half wave linear detecting circuit 13 comprises an operational amplifier OP4, resistors R7 and R8 and diodes D3 and D4 and linearly detects the half wave so as to extract the component $\dot{x}^+$, i.e., the negative component (positive component of the change rate signal $\dot{x}$ corresponding to the expanded hydropneumatic spring) of the output signal $-\dot{x}$ from the differentiator 12. The first half wave linear detecting circuit 13 then generates the output signal $\dot{x}^+$. The reversing circuit 14 comprises an operational amplifier OP5 and resistors R9 and R10 and inverts the output signal $-\dot{x}$ generated from the differentiator 12. In other words, the positive component is inverted to the negative component and vice versa, thereby generating the change rate signal $\dot{x}$. The second half wave linear detecting circuit 15 comprises an operational amplifier OP6, resistors R11 and R12, and diodes D5 and D6, and extracts the negative component (i.e., the component $\dot{x}^-$ corresponding to the compressed hydropneumatic spring) of the output signal $\dot{x}$ generated from the reversing circuit 14. The second half wave linear detecting circuit 15 then performs linear detection so as to generate the extracted component as the absolute value signal $|\dot{x}^-|$.

The operation circuit 16 comprises resistors R13 to R16 and an operational amplifier OP7. The operation circuit 16 multiplies with the corresponding coefficients the output signals $|x|$, $|\dot{x}^+|$ and $|\dot{x}^-|$ respectively generated from the full wave linear detecting circuit 11 and the first and second half wave linear detecting circuits 13 and 15, and performs reverse addition. The resistances of the resistors R13 to R16 are selected to give the coefficients A, BCs and BCc of equations (1) and (2) above. In particular, the resistances of the resistors R13, R14 and R15 are set to be R16/A, R16/BCs and R16/BCc. When the hydropneumatic spring is expanded, the operation circuit 16 generates an output $A|x|+BCs|\dot{x}^+|$. However, when the hydropneumatic spring is compressed, the operation circuit 16 generates an output $A|x|+BCc|\dot{x}^-|$. In this embodiment, the coefficient ratio for providing a vehicle vertical vibration acceleration as one of the evaluation factors for vehicle riding comfort is given to be A : B : Cs : Cc = 2 : 8 : 1 : 0.

The comparator 17 comprises a resistor R17, an operational amplifier OP8 and a reference power supply $-E$. The comparator 17 compares the output signal generated from the operation circuit 16 with the reference voltage. When the output signal is higher than the reference voltage, the comparator 17 generates a signal.

The driver III (illustrated only in FIG. 3) is connected to the comparator 17 of the controller II and amplifies the output signal generated from the comparator 17 so as to drive the driving means IV.

The hydropneumatic suspension V of the apparatus of this embodiment is a trailing arm type suspension for the rear axle and comprises an actuator disposed between an independently movable arm and the vehicle body, a damping force generating throttle device with orifices, a hydropneumatic spring and a rubber bushing of nonlinear spring characteristics.

The driving means IV constitutes a magnetic valve for changing the throttle valve so as to control the damping force generating throttle device with orifices in response to the signal generated from the driver III.

In the driving means IV and the suspension V of the apparatus according to this embodiment, the damping force generating throttle device with orifices and its magnetic valve will be described since they are associated with the main feature of the present invention.

Throttle devices 20 and 21 (FIGS. 6 and 7) are disposed to communicate with hydraulic actuators 22 and 23 and further with accumulators of hydropneumatic springs 24 and 25, respectively. Magnetic valves 26 and 27 for changing the corresponding throttle valves serve as the driving means IV driven by the driver III and are mounted on the throttle devices 20 and 21, respectively. Each of the throttle devices 20 and 21 has flow paths 20-1 and 20-2 as major flow paths which extend through first and second orifices 28 and 29 as throttle valves, respectively, as shown in FIG. 7 (only the device 20 is shown in FIG. 7). The flow path 20-1 is a straight path extending through the device 20. The flow path 20-2 flows in the magnetic valve 26 and returns through an on/off pipe. The magnetic valve 26 for changing the throttle valve is controlled such that the fluid flows through only the first orifice 28 or that the fluid flows through both the first and second orifices 28 and 29. In this manner, the opening of the throttle valve is controlled to adjust the damping force. When the output signal is not generated by the driver III (i.e., when the vehicle drives on smooth or normal roads such that the sum of the values Ax and BCs$\dot{x}$ or BCc$\dot{x}$ does not exceed the predetermined reference value, the magnetic valve 26 is controlled to cause the fluid to flow through the first and second orifices to weaken the damping forces of the hydropneumatic suspension 24. On the other hand, when the output signal is generated by the driver III (i.e., the vehicle is detected to be riding on a rough road), the magnetic valve 26 is driven to close the second orifice 29, while the first orifice 29 is kept opened, thereby increasing the damping force.

Other components of the suspension V will be described hereinafter.

Figure 6:
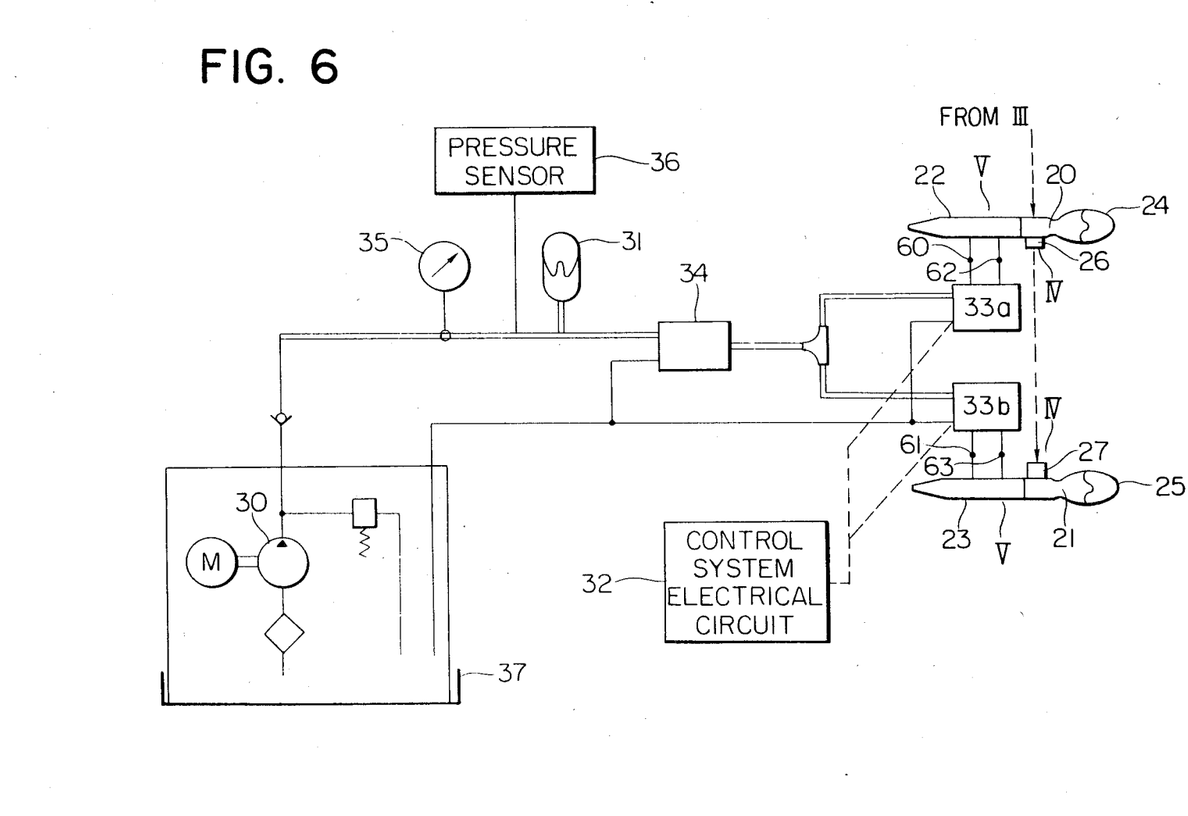
FIG. 6 schematic representation showing parts of a driving means and the hydropneumatic suspension shown in FIG. 3.
Figure 7:
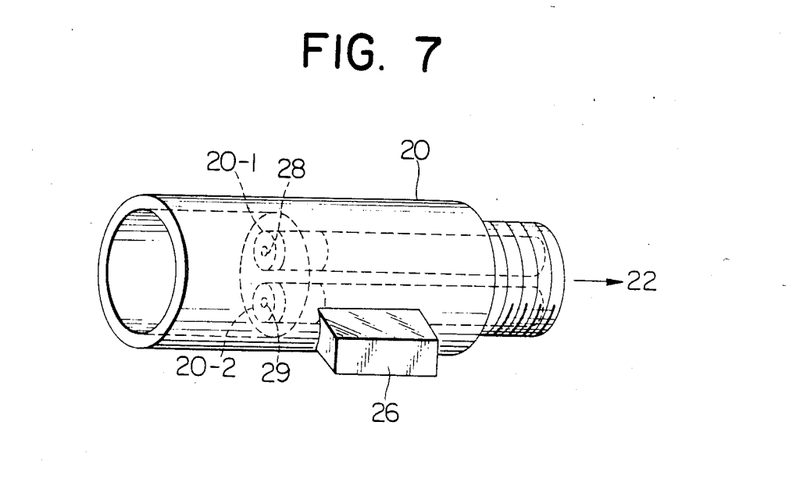
FIG. 7 is a perspective view of damping force generating throttle valves and magnetic valves for changing the throttle valve having opening shown in FIG. 6.

Referring to FIG. 6, the fluid compressed by a hydraulic pump 30 has a predetermined pressure. The compressed fluid is stored in a hydropneumatic accumulator 31. Upon energization/deenergization of the control system electrical circuit 32, magnetic valves 33a and 33b are turned on/off, and the pump is started/stopped. The compressed fluid is supplied to the actuators 22 and 23 through the magnetic valves 33a and 33b, respectively, thereby performing height control of the vehicle under the control of the electrical circuit 32.

Figure 8:
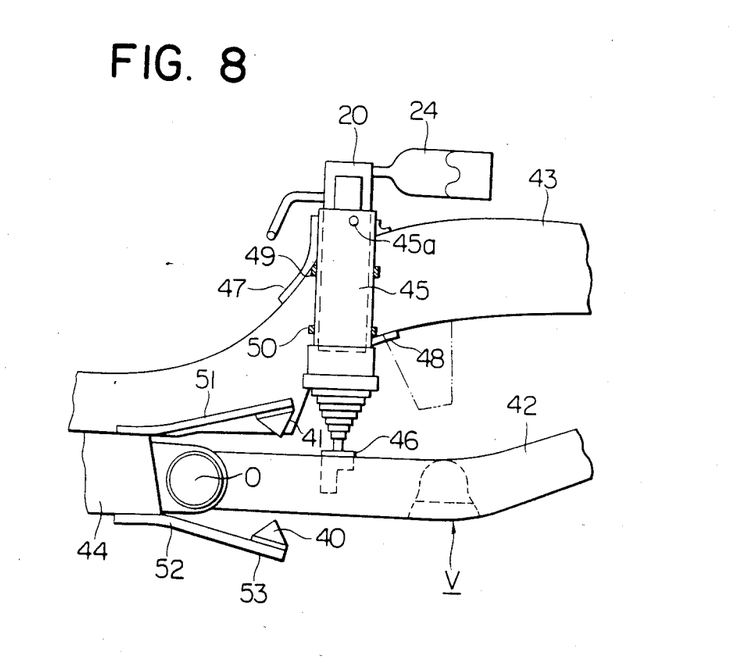
FIG. 8 is a side view showing a suspension structure of the apparatus shown in FIG. 3.
Figure 9:
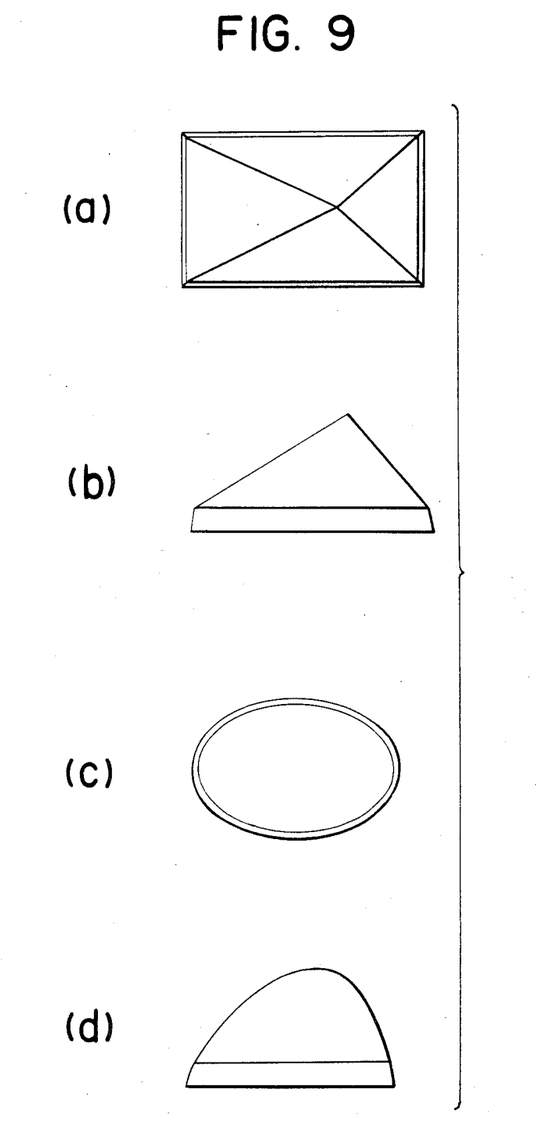

As is apparent from the above description, the active suspension comprises the actuators 22 and 23, the damping force throttle devices 20 and 21 with the orifices 28 and 29, the magnetic valves 26 and 27 for changing the corresponding throttle valves, rubber bushings 40 and 41 (FIG. 8) of nonlinear spring characteristics, and the hydropneumatic springs 24 and 25. In this embodiment, the active suspension is installed between a trailing arm 42 and a vehicle body 43, as shown in FIG. 8. The installation of the actuator of the active suspension and the rubber bushing of nonlinear spring characteristics will now be described in more detail with reference to FIG. 8. For illustrative convenience, only the unit for the rear left wheel is exemplified.

The trailing arm 42 of the suspension system which holds the corresponding wheel is held through a rear suspension member 44. In order to install the active suspension, an actuator mounting cylinder 45 is welded on the vehicle body. In addition, an actuator mounting portion 46 is welded to the trailing arm 42.

The boot column of the active suspension is mounted on and fixed to the mounting portion 46 of the boot column. On the other hand, the actuator is fixed to the actuator mounting cylinder 45 through a set screw 45a so as to compensate for the working force between the vehicle body 43 and the suspension system. The actuator mounting cylinder 45 is mounted on the vehicle body in such a reinforced manner that abutment plates 47 and 48 are respectively welded to the upper and lower surfaces of the body 43. In this case, when hard rubber buffer rings 49 and 50 are inserted between the body 43 and the mounting cylinder 45, vibrations and noise can be greatly decreased.

The installation of the rubber bushings 40 and 41 of nonlinear spring characteristics will be described. The rubber bushings 40 and 41 are fixed by bush holding bolts 53 on bush holding arms 52 and 51, respectively. End portions of the bush holding arms 51 and 52 are supported on the suspension member 44. The shape of the rubber bushings may be an irregular pyramid having a top point offset from the center thereof as shown in FIGS. 9A and 9B or an irregular elliptic cone having a top point offset from the center thereof as shown in FIGS. 9C and 9D, since the rotational displacement of the arm is increased in accordance with an increase in radius of the arm rotation. In particular, since the trailing arm 42 is rotated about a point O, the distortions of the bushings 40 and 41 are increased in accordance with an increase in radius of rotation of the trailing arm 42. Therefore, when the shape of the rubber bushings 40 and 41 is formed such that a center of deformation is gradually shifted toward a large radius direction, the center of the load is smoothly and stably shifted, thereby obtaining smooth nonlinear characteristics of the relationship between the displacement as a result of contact between the rubber bushings 40 and 41 and the trailing arm 42 and the resultant spring force.

Figure 10:
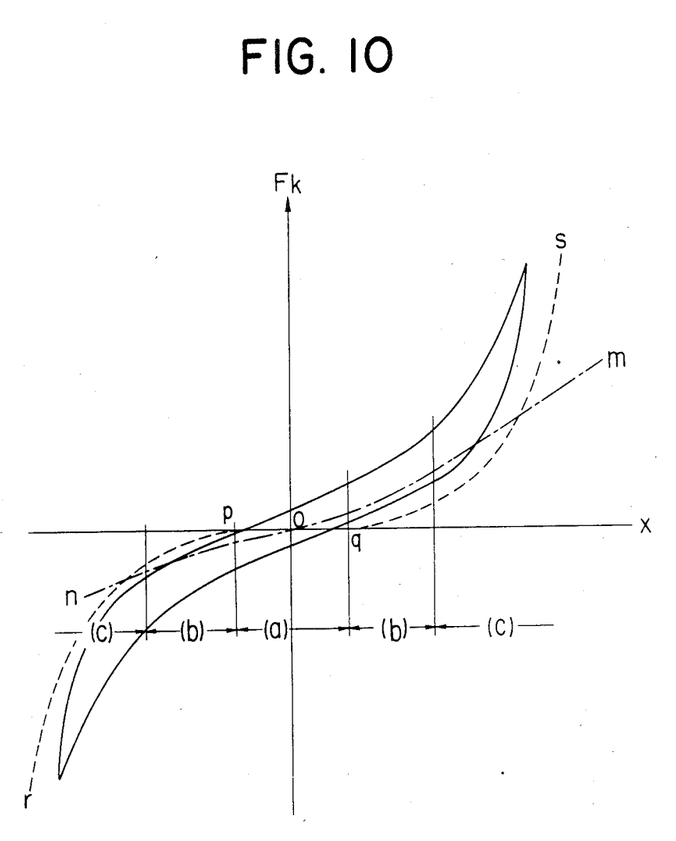
FIG. 10 is a graph showing characteristics of a nonlinear spring in the apparatus shown in FIG. 3.

The nonlinear spring characteristics are given as a change in spring force Fk as a function of the relative displacement x, as shown in FIG. 10. A curve nom is a characteristic curve obtained by only the gas spring force; a curve qs shows a characteristic curve obtained by only the rubber bushing 41 at the contraction stroke; and a curve pr is a characteristic curve obtained by only the rubber bushing 40 at the expanding stroke.

The overall spring characteristics have a hysteresis indicated by the solid lines which is divided into three regions (a), (b) and (c). In the region (a), only the hydropneumatic spring is operated since neither rubber bushing abuts against the trailing arm 42. In the region (b), both the hydropneumatic spring and the corresponding rubber bushing are operated. In the region (c), mainly the corresponding rubber bushing is operated. Control according to the present invention covers various travel conditions in accordance with these nonlinear characteristics.

The active suspension apparatus of this embodiment comprises a height control mechanism. The principle of the height control mechanism will be described with reference to FIGS. 6 and 11.

The hydropneumatic pressure for height control of the vehicle is accumulated by the accumulator 31, as shown in FIG. 6. Inflow magnetic valves 60 and 61 and outflow magnetic valves 62 and 63 are turned on/off to control the level of the axles.

Figure 11:
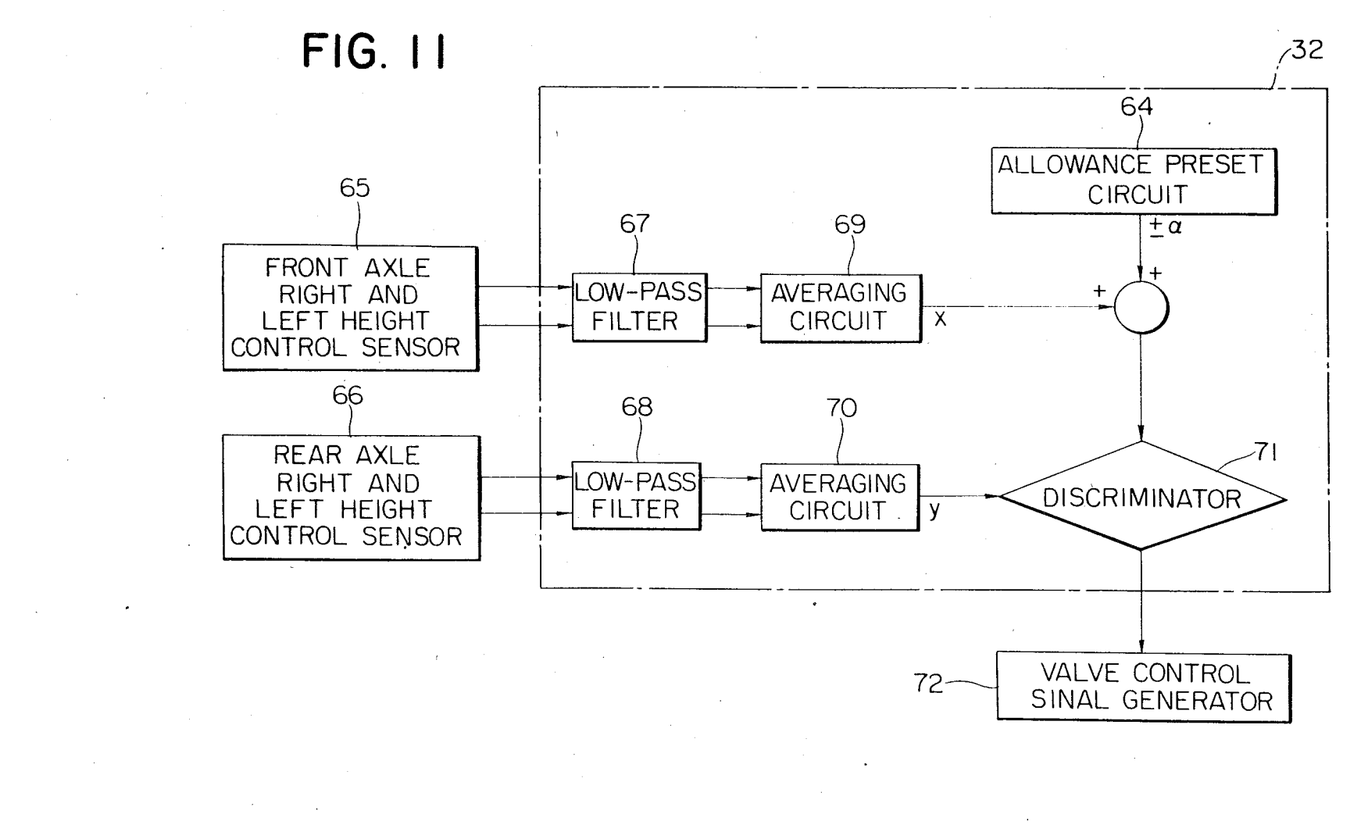
FIG. 11 is a block diagram of a vehicle height adjustment mechanism including a control system electrical circuit shown in FIG. 6.

The operation flow in the electrical circuit 32 will be described below with reference to FIG. 1. A height control range $\pm\alpha$ is preset in an allowance preset circuit 64. Signals from front axle right and left height control sensors 65 are supplied to an averaging circuit 69 through a low-pass filter 67. The averaging circuit 69 generates a target value $x_1$. Meanwhile, signals from rear axle right and left height control sensors 66 are supplied to an averaging circuit 70 through a low-pass filter 68. The averaging circuit 70 generates a mean value $y_1$. A discriminator 71 compares sums $(x_1 \pm \alpha)$ of the allowable value $\pm\alpha$ and the target value $x_1$ with the mean value $y_1$ and generates a discrimination signal through a valve control signal generator 72 to turn on/off the magnetic valves 60 and 61 and the magnetic valves 62 and 63. More particularly, the discriminator 71 causes the magnetic valves to turn on when $y_1 < x_1 - \alpha$ and $y_1 > x_1 + \alpha$ and to turn off when $x_1 - \alpha < y_1 < x_1 + \alpha$.

In this manner, height control can be performed such that the relative displacements between the front axle and the vehicle body and between the rear axle and the vehicle body fall within the predetermined range so as to maintain the vehicle body at a constant level, even if passengers ride on the rear seat or luggage or the like is loaded in the trunk.

As is exemplified by the above embodiment, the active suspension apparatus can obtain an optimal travel state signal in accordance with the the sum of a product obtained by multiplying the relative displacement x with a predetermined coefficient and a product obtained by multiplying the change rate $\dot{x}$ with another predetermined coefficient, so that riding comfort and stability and controllability are greatly improved. This is because the optimal travel state signal is used to control the characteristics of damping force of each hydropneumatic suspension. Therefore, the riding comfort, and stability and controllability can be improved in every driving condition.

Furthermore, in the above embodiment, the deformation of the rubber bushing disposed parallel to the hydropneumatic spring is incorporated to obtain progressive type characteristics of the spring of the suspension system. The stability and controllability of the vehicle are thus further improved. When a large displacement occurs, the rubber bushing serves as a secondary damper or a bounce stopper to dampen the excessive external force.

Furthermore, the apparatus of the present invention has hydropneumatic devices, so that a predetermined hydropneumatic fluid is worked by using a pneumatic accumulator and a magnetic valve, thereby arbitrarily performing vehicle height control. The vehicle posture can be kept constant irrespective of the load of the vehicle so as to contribute to safe driving. In addition, the stroke margin of the wheels can be small, so that the vehicle height can be lowered. As a result, secondary effects such as high hydrodynamic efficiency, good road holding of the vehicle and low fuel consumption can be obtained.

WHAT IS CLAIMED IS:

1. An active suspension apparatus incorporating a hydropneumatic spring for suspending a vehicle body on wheels by using a hydropneumatic pressure, comprising:

displacement detecting means for detecting a relative displacement (x) between an axle and the vehicle body;

discriminating means for discriminating a travel road surface state in accordance with a sum $(Ax + B\dot{x})$ of a signal obtained by multiplying the relative displacement (x) with a first coefficient and a signal obtained by multiplying a change rate $(\dot{x})$ in unit time of the relative displacement with a second coefficient, the first and second coefficients being determined in accordance with riding comfort against vibrations;

hydropneumatic suspension means having hydropneumatic springs with hydropneumatic chambers, actuators, and throttle valves respectively disposed between said hydropneumatic chambers and said actuators; and driving means for controlling opening area of said throttle valves in accordance with a road surface state signal supplied from said discriminating means, whereby characteristics of a damping force are controlled in accordance with the road surface state signal.

2. An apparatus according to claim 1, wherein said discriminating means comprises: a differentiator for differentiating the relative displacement (x) detected by said displacement detecting means and generating the change rate $(\dot{x})$ of the relative displacement; a selecting circuit for extracting a component $(\dot{x}+)$ corresponding to an expanded side of said hydropneumatic springs and a component $(\dot{x}-)$ corresponding to a compressed side of said hydropneumatic spring thereof from the change rate (x) generated from said differentiator; an operation circuit for multiplying the components $(x+, x-)$ of the change rate $(\dot{x})$ with predetermined coefficients and adding the resultant products; and a comparator for comparing an output signal generated from said operation circuit with a reference value and generating the road surface state signal.

3. An apparatus according to claim 2, wherein said selecting circuit comprises: a first half wave detecting circuit for extracting the component of one polarity corresponding to said expanded side of said hydropneumatic spring from a signal which represents the change rate (x) and which is generated from said differentiator, and for producing an absolute value of the component of the one polarity; and a second half wave detecting circuit for extracting the component of the other polarity corresponding to said compressed side of said hydropneumatic spring from the signal which represents the change rate $(\dot{x})$ and which is generated from said differentiator, and for producing an absolute value of the component of the other polarity.

4. An apparatus according to claim 3, wherein said discriminating means further comprises a full wave linear detecting circuit for generating a signal corresponding to an absolute value of the relative displacement (x) detected by said displacement detecting means.

5. An apparatus according to claim 4, wherein said operation circuit comprises an adder for multiplying different predetermined coefficients to the signal generated from said full wave linear detecting circuit and signals generated from said first and second half wave detecting circuits, and for adding the resultant signals.

6. An apparatus according to claim 5, wherein said operation circuit is arranged such that the predetermined coefficient multipled with the component corresponding to the expanded side of said hydropneumatic spring is larger than that multiplied with the component corresponding to the compressed side of said hydropneumatic spring.

7. An apparatus according to claim 1, wherein said comparator compares the signal generated from said operation circuit with a predetermined reference signal and generates a first signal representing that a road has a first road surface state when the signal from said operation circuit is smaller than the predetermined reference signal, and a second signal representing that the road has a second road surface state when the signal from the operation circuit is larger than the predetermined reference signal.

8. An apparatus according to claim 1, wherein each of said throttle valves of said hydropneumatic suspension means comprises first and second orifices having respective predetermined opening areas, said driving means is operated such that said first and second orifices are opened when a damping force is to be weakened in accordance with a discrimination result of said discriminating means and that one of said first and second orifices is opened when the damping force is to be strengthed in accordance with the discrimination result.

9. An apparatus according to claim 1, wherein said hydropneumatic suspension means further includes rubber bushings which are operated as elastic members in a large relative displacement region so as to provide a nonlinear characteristic between spring forces of said hydropneumatic springs and the relative displacement.

10. An apparatus according to claim 9, wherein said rubber bushing is one of an irregular pyramid and an elliptic cone having a top point offset from the center thereof.

* * * * *

UNITED STATES PATENT AND TRADEMARK OFFICE
CERTIFICATE OF CORRECTION

PATENT NO. : 4,579,366
DATED : April 1, 1986
INVENTOR(S) : Shunchi Doi et al

It is certified that error appears in the above—identified patent and that said Letters Patent is hereby corrected as shown below:

IN THE CLAIMS:

Claim 2, line 10; change "(x)" to --($\dot{x}$)-- line 11; change "($x^+,x^-$)" to --($\dot{x}^+,\dot{x}^-$)--

Claim 3, line 6; change "(x)" to --($\dot{x}$)--

Signed and Sealed this

Twenty-third Day of September 1986

[SEAL]

Attest:

DONALD J. QUIGG

Attesting Officer

Commissioner of Patents and Trademarks